United States Patent
Phillips et al.

(10) Patent No.: US 10,104,413 B2
(45) Date of Patent: Oct. 16, 2018

(54) BANDWIDTH AND ABR VIDEO QOE MANAGEMENT BASED ON OTT VIDEO PROVIDERS AND DEVICES

(71) Applicant: TELEFONAKTIEBOLAGET LM ERICSSON (PUBL), Stockholm (SE)

(72) Inventors: Chris Phillips, Hartwell, GA (US); Robert Hammond Forsman, Sugar Hill, GA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/437,077

(22) Filed: Feb. 20, 2017

(65) Prior Publication Data

US 2018/0014050 A1    Jan. 11, 2018

Related U.S. Application Data

(60) Provisional application No. 62/359,388, filed on Jul. 7, 2016.

(51) Int. Cl.
| | |
|---|---|
| *H04N 7/173* | (2011.01) |
| *H04N 21/2662* | (2011.01) |
| *H04N 21/236* | (2011.01) |
| *H04N 21/24* | (2011.01) |

(52) U.S. Cl.
CPC ... *H04N 21/2662* (2013.01); *H04N 21/23605* (2013.01); *H04N 21/2402* (2013.01)

(58) Field of Classification Search
CPC ........... H04N 21/2662; H04N 21/2402; H04N 21/2407; H04N 21/4722; H04N 21/4532; H04N 21/234

USPC ......................................................... 725/116
See application file for complete search history.

(56) References Cited

U.S. PATENT DOCUMENTS

| | | |
|---|---|---|
| 7,873,074 B1 | 1/2011 | Boland |
| 8,041,808 B1 | 10/2011 | Becker |
| 8,681,614 B1 | 3/2014 | McCanne et al. |
| 9,264,508 B2 | 2/2016 | Wolf et al. |
| 9,628,405 B2 | 4/2017 | Dasher et al. |
| 2002/0023168 A1 | 2/2002 | Bass et al. |

(Continued)

FOREIGN PATENT DOCUMENTS

| | | |
|---|---|---|
| WO | WO 2013/191963 A1 | 12/2013 |
| WO | WO 2015/038277 A1 | 3/2015 |

(Continued)

*Primary Examiner* — Michael B Pierorazio

(57) ABSTRACT

An Adaptive Bitrate (ABR) Quality of Experience (QoE) Management Unit, system, and method for managing bandwidth usage and QoE at a customer premises where multiple client devices independently download content from multiple providers. The ABR QoE Management Unit assigns a priority level to each provider and to each client device, translates the assigned priority levels into weights, and utilizes the weights in a Weighted Fair Queuing (WFQ) algorithm to control, at any given time, an amount of bandwidth each client device is allowed to utilize to download content from any given provider, thereby maintaining a desired QoE for each client device/provider combination. The Unit may utilize Phantom Packet Transmission (PPT) WFQ to prevent a first client device from increasing its bit rate when a second client device is in an idle phase of its duty cycle due to a full buffer.

18 Claims, 16 Drawing Sheets

(56) References Cited

U.S. PATENT DOCUMENTS

| | | |
|---|---|---|
| 2008/0037420 A1 | 2/2008 | Tang |
| 2011/0188439 A1* | 8/2011 | Mao .................. H04N 7/17318 |
| | | 370/312 |
| 2014/0280764 A1 | 9/2014 | Dasher et al. |
| 2014/0281002 A1 | 9/2014 | Sun |
| 2014/0282777 A1* | 9/2014 | Gonder ................ H04L 65/605 |
| | | 725/109 |
| 2015/0249623 A1 | 9/2015 | Phillips et al. |
| 2015/0334150 A1 | 11/2015 | Dasher et al. |

FOREIGN PATENT DOCUMENTS

| | | |
|---|---|---|
| WO | WO 2015/155679 A1 | 10/2015 |
| WO | WO 2016/128890 A1 | 8/2016 |

* cited by examiner

BANDWIDTH AND ABR VIDEO QOE MANAGEMENT BASED ON OTT VIDEO PROVIDERS AND DEVICES

RELATED APPLICATIONS

This application claims the benefit of U.S. Provisional Application No. 62/359,388 filed Jul. 7, 2016, the disclosure of which is fully incorporated herein by reference.

TECHNICAL FIELD

The present disclosure relates to communication systems, and more particularly to a system, apparatus, and method for controlling delivery of data to a user to remain within a data cap while avoiding excessive data throttling.

BACKGROUND

Global Internet traffic has experienced dramatic growth in recent years. Video has been a major contributor to this growth and will continue to dominate the traffic on the networks. This trend is the result of the increase in the popularity of devices like smartphones, tablets, gaming devices and smart TVs for accessing Over-The-Top (OTT) video content. In addition to Quality of Service (QoS), operators are now expected to provide video services to these devices with the same Quality of Experience (QoE) that the consumers with traditional TV services are accustomed to. It should be noted that QoS metrics capture objective and system-related characteristics, such as latency, throughput, and the like, while QoE metrics are typically subjective and user-oriented, such as consistent video quality. QoS focuses on the performance of the network while QoE focuses on the end users' experience of a service.

Adaptive bitrate (ABR) video has become the primary delivery means for consumers watching video over the Internet. ABR streaming is a technology for streaming multimedia over computer networks. It adjusts video stream quality in real time by detecting the user's available bandwidth throughout the video session. In ABR, the source content is compressed at multiple bit rates. Each bit rate stream is then partitioned into multiple segments and stored in the server. The stream set has a designated segment duration (typically between 2 and 10 seconds) and is divided into uniform segments accordingly. Upon a GET request, the streaming client is provided a manifest file with the available bit rate streams and the segments of the streams. The client, depending on implementation, selects the video rate that is most appropriate for its needs based on network conditions. In addition to maximizing QoE by minimizing video pauses due to buffering issues when watching video over an unmanaged network, ABR attempts to provide a good viewing experience to users to all devices.

Most adaptive streaming technologies are built for transmission over HTTP/TCP/IP. This is due to the fact that, firstly, HTTP is a connectionless protocol; meaning it does not maintain a fixed link between the source and the destination for the entire duration of the session. Secondly, HTTP traffic can easily traverse through firewalls and Network Address Translation (NAT) in the Internet. Thirdly, HTTP works well with standard transparent caching and Content Delivery Networks (CDNs), making it much more scalable than Real-time Transport Protocol (RTP).

Low QoE means that there is no guarantee that the video quality remains consistent. For example, a device that is downloading content at 8 Mbps and watching content at 1080p at any instant may experience network congestion and lower its download bit rate to 2.5 Mbps, thereby degrading the quality of the video to, for example, 480p. Upon improvement of the network state, the device will shift back to a higher bit rate and hence a better video quality. Such frequent switching of video quality causes poor QoE.

Some existing systems attempt to manage QoE and bandwidth by generating a custom manifest based on bandwidth or devices. However, suboptimal client behavior of flushing and reloading segments results in a lot of wasted bandwidth and inconsistency in video QoE. Additionally, bandwidth contention causes inaccurate client models of available bandwidth resulting in suboptimal bitrate selection. It is important to note that with ABR streaming, the encoded video bit rate and the delivery bit rate over the network are not the same. Thus, the manifest does not control the bandwidth delivery of each segment.

There are also some custom players from video providers which attempt to exchange information when both players are attempting to watch content from the same OTT provider.

Traffic management in routers is controlled based on the traffic class. HTTP traffic can be assigned a priority classification and UDP traffic can have another priority classification.

SUMMARY

Research in ABR streaming has proven that attempting to control bandwidth or QoE with ABR video does nothing to improve bandwidth management and QoE on a congested link with two or more devices attempting to watch video.

In order to properly manage the QoE and bandwidth for ABR video, management must go down to the flow level. Since ABR video is delivered over http/https, there are no router implementations which improve ABR bandwidth management and QoE. In addition, in nearly all cases, ABR video is encrypted, so deep packed inspection algorithms are not good for determining ABR traffic.

There are no known QoE/bandwidth management systems that allow a user to set a desired QoE level based on an OTT content provider. Today many people subscribe to multiple OTT providers, and family members in a household may be watching content from multiple OTT providers at the same time. This can have a major impact on the bandwidth as well as create a poor QoE for each of the users attempting to watch video.

The present disclosure describes an ABR QoE Management Unit, which may be implemented in an OTT Gateway, home Wi-Fi router, or cable modem at the customer premises. The unit manages ABR QoE across OTT providers as well as across a multitude of OTT devices inside the home. The unit assigns a priority for each OTT provider and for each OTT device. The priorities translate into weights which are used by Weighted Fair Queuing (WFQ) bandwidth management systems (plain, phantom, or mixed).

The disclosed ABR QoE Management Unit may be implemented in a custom over-the-top (OTT) gateway, consumer grade home Wi-Fi router, or cable modem at the customer premises. The unit may also be implemented in a Virtual Residential Gateway (vRGW), Broadband Network Gateway (BNG), or virtual instance just prior to a BNG.

In one embodiment, the present disclosure is directed to a computer-controlled method in an Adaptive Bitrate (ABR) Quality of Experience (QoE) Management Unit for managing bandwidth usage and QoE at a customer premises where multiple client devices independently download content from multiple providers. The method includes assigning a priority level to each provider and to each client device; translating the assigned priority levels into weights; and utilizing the weights in a WFQ algorithm to control, at any given time, an amount of bandwidth each client device is allowed to utilize to download content from any given provider, thereby maintaining a desired QoE for each client device/provider combination.

In another embodiment, the present disclosure is directed to an ABR QoE Management Unit for managing bandwidth usage and QoE at a customer premises where multiple client devices independently download content from multiple providers. The ABR QoE Management Unit includes an interface configured to receive all data entering the premises and to monitor all data usage by the premises; and a processing circuit configured to assign a priority level to each provider and to each client device, translate the assigned priority levels into weights, and utilize the weights in a WFQ algorithm to control, at any given time, an amount of bandwidth each client device is allowed to utilize to download content from any given provider, thereby maintaining a desired QoE for each client device/provider combination.

In another embodiment, the present disclosure is directed to a system for managing bandwidth usage and QoE at a customer premises where multiple client devices independently download content from multiple providers. The system includes a gateway providing a single point of entry for data entering the premises; and an ABR QoE Management Unit in communication with the gateway. The ABR QoE Management Unit includes a processing circuit configured to: assign a priority level to each provider and to each client device, translate the assigned priority levels into weights, and utilize the weights in a WFQ algorithm to control, at any given time, an amount of bandwidth each client device is allowed to utilize to download content from any given provider, thereby maintaining a desired QoE for each client device/provider combination.

The disclosed system provides a way to manage overall bandwidth usage inside a home. However it is primarily focused on providing the ability to manage ABR QoE across OTT providers as well as across the multitude of OTT devices inside the home.

The disclosed system is network neutrality friendly in that it allows the subscriber to control their own choices of which provider gets high quality versus others when multiple devices inside the home are attempting to watch OTT video delivered from multiple OTT providers at the same time.

The disclosed system benefits end users because it allows them to have much better control over their network usage. In particular it generates a much better QoE when multiple people inside the same home are attempting to watch OTT video.

BRIEF DESCRIPTION OF THE DRAWINGS

In the following section, the invention will be described with reference to exemplary embodiments illustrated in the figures, in which.

DETAILED DESCRIPTION

Figure 1:
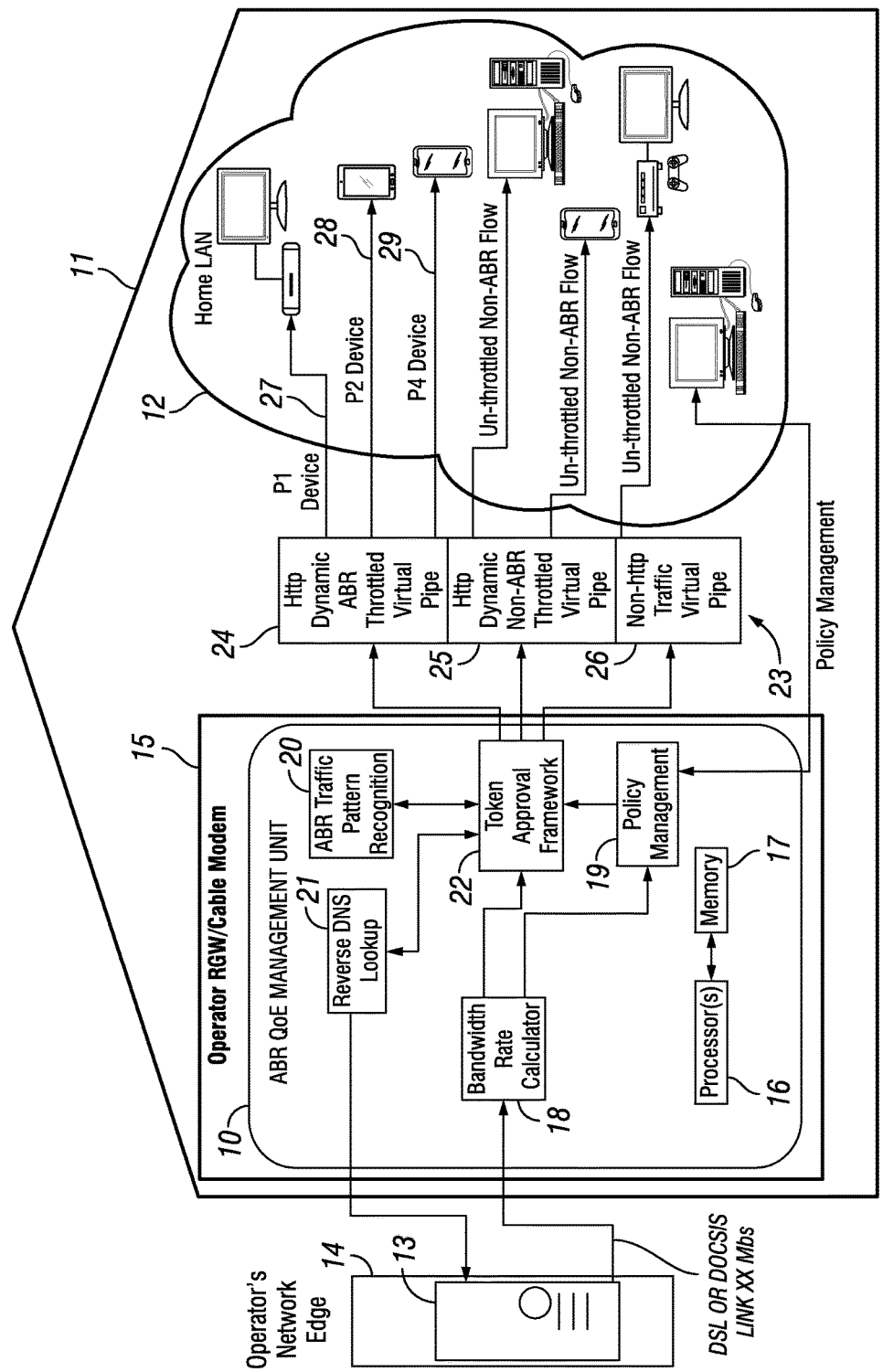
FIG. 1 is a simplified block diagram of an exemplary embodiment of the disclosed ABR QoE Management Unit implemented in a home or other premises.

The disclosed system will now be described more fully hereinafter with reference to the accompanying drawings, in which preferred embodiments of the system are shown. This invention may, however, be embodied in many different forms and should not be construed as limited to the embodiments set forth herein; rather, these embodiments are provided so that this disclosure will be thorough and complete, and will fully convey the scope of the assembly to those skilled in the art. In the drawings, like reference signs refer to like elements.

FIG. 1 is a simplified block diagram of a first exemplary embodiment of the disclosed ABR QoE Management Unit 10 implemented in a home or other premises 11 containing a plurality of client devices, which may be connected to a Home Local Area Network (LAN) 12. Data may reach the home from a service provider's gateway 13 in an operator's network 14 via, for example, a Digital Subscriber Line (DSL) or Data Over Cable Service Interface Specification (DOCSIS) link. The service provider's gateway may be, for example a Digital Subscriber Line Access Multiplexer (DSLAM) or a Cable Modem Termination System (CMTS).

The ABR QoE Management Unit 10 may be implemented, for example, in an operator supplied cable modem or residential gateway (RGW) 15, in an OTT provider supplied GW, in a consumer grade home Wi-Fi router, or the like. The ABR QoE Management Unit may include a number of units controlled by a processing circuit comprising one or more processors 16 executing computer program instructions stored on a memory 17. The units may include a bandwidth rate calculator 18 (specifically for Data Over Cable Service Interface Specification (DOCSIS) links), a policy management unit 19, an ABR traffic pattern recognition unit 20 (as in U.S. Patent Application Publication No. 2016/0277299 entitled System and Method for Categorizing Packet Flows in a Network) incorporated by reference herein, a reverse DNS lookup unit 21, and a framework for mixed managed and best-effort token approval 22. Since bandwidth is shared in a DOCSIS network, bandwidth is advertised as "up to" a set maximum bandwidth, while Digital Subscriber Line (DSL) networks provide a guaranteed bandwidth. Therefore, the size of the premises bandwidth pipe can change drastically over time based on the consecutive data usage across the service group(s).

The ABR QoE Management Unit 10 includes nested virtual pipes 23-29. An outer virtual pipe 23 is sized the same as the physical pipe (same size as the Internet pipe). The outer virtual pipe carries both http traffic (ABR and non-ABR) and non-http traffic. Thus, inside the outer pipe there are a number of inner virtual pipes including an http dynamic ABR throttled virtual pipe 24, an http dynamic non-ABR throttled virtual pipe 25, and a non-http traffic virtual pipe 26. The http dynamic ABR throttled virtual pipe 24 may be additionally divided into inner virtual pipes 27-29, which use Phantom packet transmission WFQ to allow weighting at the pipe level. Each OTT provider may be assigned to an inner virtual pipe. Phantom packet transmission WFQ is applied to each of the flows inside the pipe, which allows for weighting/setting a priority (e.g., P1-P4) based on the corresponding user device and OTT provider. The http dynamic non-ABR throttled virtual pipe 25 allows for devices to be weighted as well. The non ABR pipe is managed by a standard WFQ bandwidth management technique.

When a virtual pipe is not in use, its bandwidth can be shared with other virtual pipes. Since the vast majority of traffic today is either http or https, only flows to the user devices in those pipes are managed by a bandwidth management technique. Hence, non-http traffic flows are best effort. Phantom packet transmission WFQ is described in U.S. Pat. No. 9,467,387 entitled System and Method for Managing Bandwidth Responsive to the Duty Cycle of an ABR Client and U.S. Patent Application Publication No. 2016/0234126 entitled System and Method for Managing Bandwidth Responsive to the Duty Cycle of an ABR Client, both of which are incorporated by reference herein. Phantom packet transmission WFQ enables non-ABR video traffic to use the available bandwidth inside the http pipe at any point in time. For ABR video sessions, the rate is locked per session, preventing the ABR device from constantly changing bit rates and resolution/quality based on the duty cycles of other ABR devices. The only time the rate changes is based on when another ABR session is terminated. In U.S. Pat. No. 9,467,387 and U.S. Patent Application Publication No. 2016/0234126, all http flows are inside the same virtual pipe, and ABR video sessions are allocated bandwidth differently than non-ABR http sessions. In one aspect, the present disclosure expands on these previous publications in that the ABR device duty cycle bandwidth is now shared from the ABR Video virtual pipe to the non-ABR http pipe.

Figure 2:
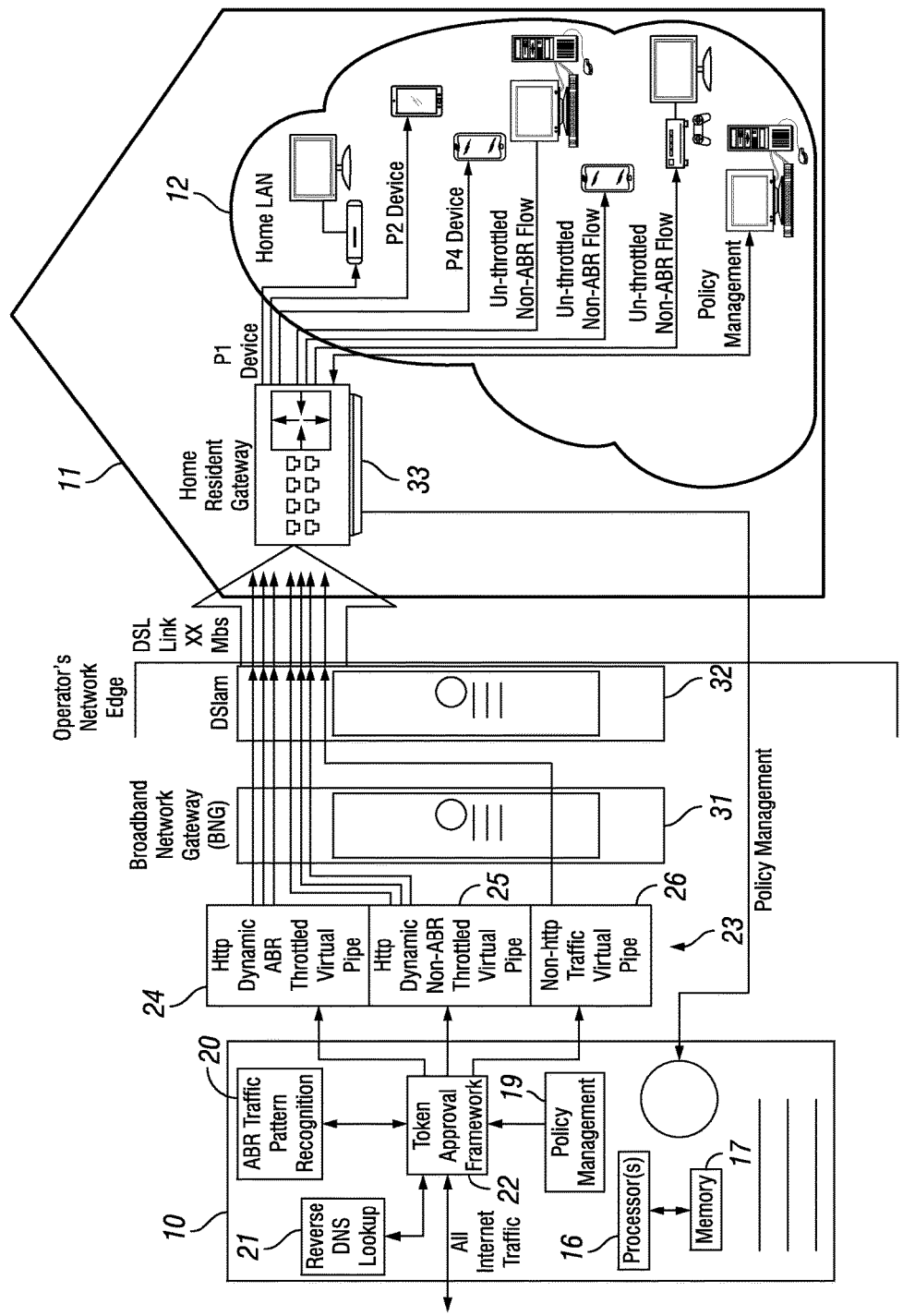
FIG. 2 is a simplified block diagram of a second exemplary embodiment of the disclosed ABR QoE Management Unit implemented in a home or other premises.

FIG. 2 is a simplified block diagram of a second exemplary embodiment of the disclosed ABR QoE Management Unit 10. In particular, FIG. 2 illustrates an implementation of the unit in a DSL network edge. FIG. 2 illustrates an example in which the ABR QoE Management Unit 10 is implemented as a virtual instance immediately upstream of a Broadband Network Gateway (BNG) 31. This implementation could also be inside a vRGW instance or inside of the BNG, for example. The basic functionality of the ABR QoE Management Unit is the same as in FIG. 1. The various virtual pipes carry the data flows to the home or other premises 11 through, for example, a DSLAM 32 and a home residential gateway (RGW) 33.

Figure 3:
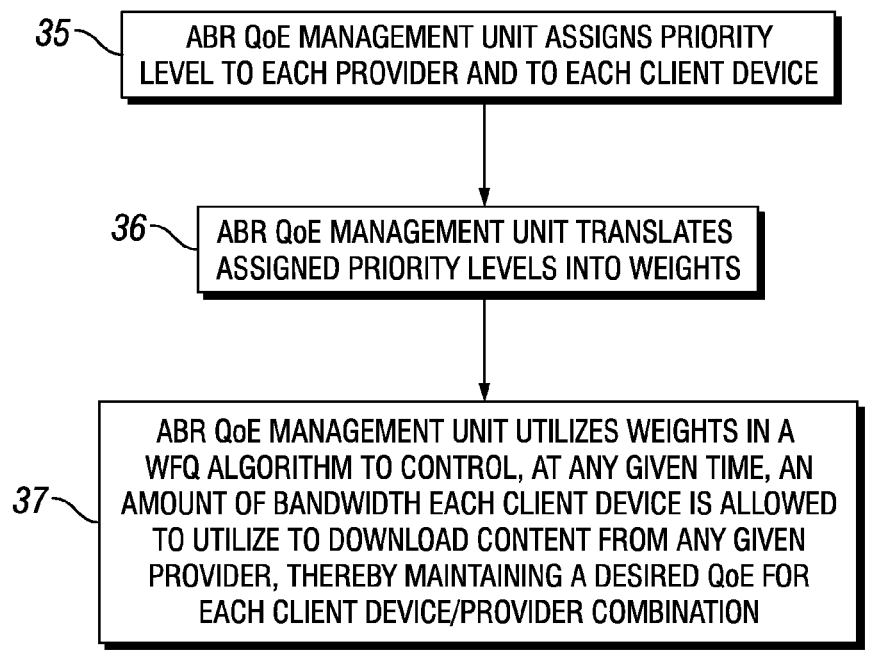
FIG. 3 is a flow chart of an overall method of managing bandwidth usage and QoE at a customer premises in an exemplary embodiment of the present disclosure.

FIG. 3 is a flow chart of an overall method of managing bandwidth usage and QoE at a customer premises in an exemplary embodiment of the present disclosure. The customer premises includes multiple client devices that independently download content from multiple providers. At step 35, the ABR QoE Management Unit 10 assigns a priority level to each provider and to each client device. At step 36, the ABR QoE Management Unit translates the assigned priority levels into weights. At step 37, the ABR QoE Management Unit utilizes the weights in a WFQ algorithm to control, at any given time, an amount of bandwidth each client device is allowed to utilize to download content from any given provider, thereby maintaining a desired QoE for each client device/provider combination.

Figures 4A, 4B, 4C:
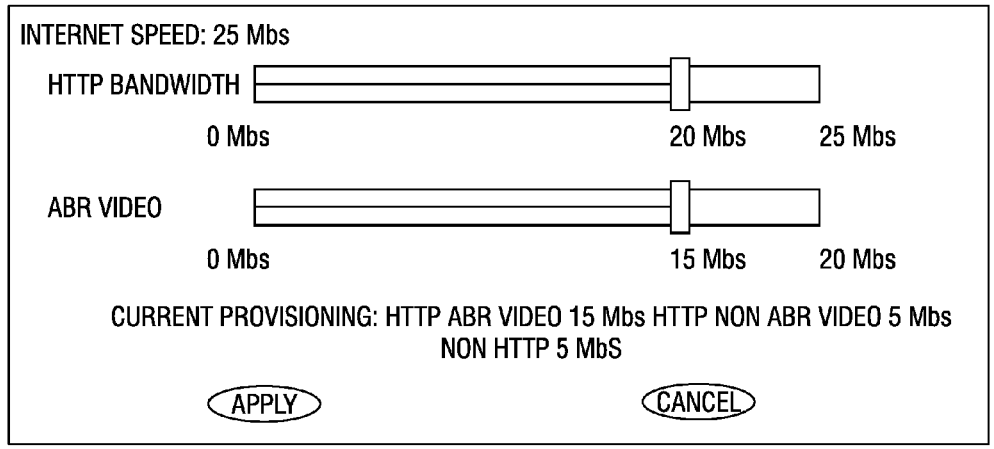
FIGS. 4A-4C show exemplary embodiments of Pipe Bandwidth Provisioning, OTT Provider Priority Policy Management, and Device Priority Policy Management, respectively, in the disclosed system.

FIGS. 4A-4C show exemplary embodiments of user interfaces for provisioning pipe bandwidth, setting priorities for OTT providers, and setting priorities for client devices, respectively, in the disclosed system.

FIG. 4A shows an exemplary embodiment of a user interface for provisioning pipe bandwidth. The outer virtual pipe 23 is sized to the Internet pipe size of 25 Mbs. An http virtual pipe is provisioned for 20 Mbs. Within the http virtual pipe, an http dynamic ABR throttled virtual pipe 24 is provisioned for 15 Mbs. This leaves 5 Mbs for the http dynamic non-ABR throttled virtual pipe 25 and 5 Mbs for the non-http traffic virtual pipe 26.

FIG. 4B provides examples for assigning a priority level (from Priority 1 to Priority 4 in this example) for each OTT provider.

FIG. 4C provides examples for assigning a priority level (from Priority 1 to Priority 4 in this example) for each client device. Ultimately, the priority translates into a weight, which is used by the Weighted Fair Queuing (WFQ) bandwidth systems discussed below. Example priority-to-weight translations may be Priority 1=weight of 3.0; Priority 2=weight of 1.5; Priority 3=weight of 0.75; and Priority 4=weight of 0.375. These device weights are used in both ABR video traffic flows as well as non-ABR video traffic flows. Non-http flows remain best effort.

Weighted Fair Queuing (WFQ)

WFQ algorithms enable the fraction of link capacity that will be allocated to each flow to be specified. Each household and client gets its weighted share of the bandwidth over time without a control plane having to adjust bandwidth caps. Although routers are already equipped with a WFQ algorithm, several problems arise when applying it to ABR bandwidth management:

1. Today's routers can control traffic classification. They can be configured to give http or https traffic a certain priority related to other classifications of traffic such as UDP, RTP, and FTP. Since progressive download of ABR video is delivered either by http or https, the router has no way of knowing the difference between ABR video sessions, download of OS/game patch sessions, checking of email, or just plain web surfing. Deep packet inspection could differentiate between video traffic, but both content encryption and transport encryption remove this option.

2. Even if the routers could recognize ABR video flows, they have no way of prioritizing certain streams over others. Operators, however, would prefer to apply policies to individual video sessions. Even if the encryption problem did not exist and the routers could recognize ABR video traffic, they cannot achieve the desired level of granularity that the operator would like to control.

3. The generic WFQ algorithms also cause issues with ABR video delivery due to the duty cycle and greedy nature of the ABR clients.

Figure 5:
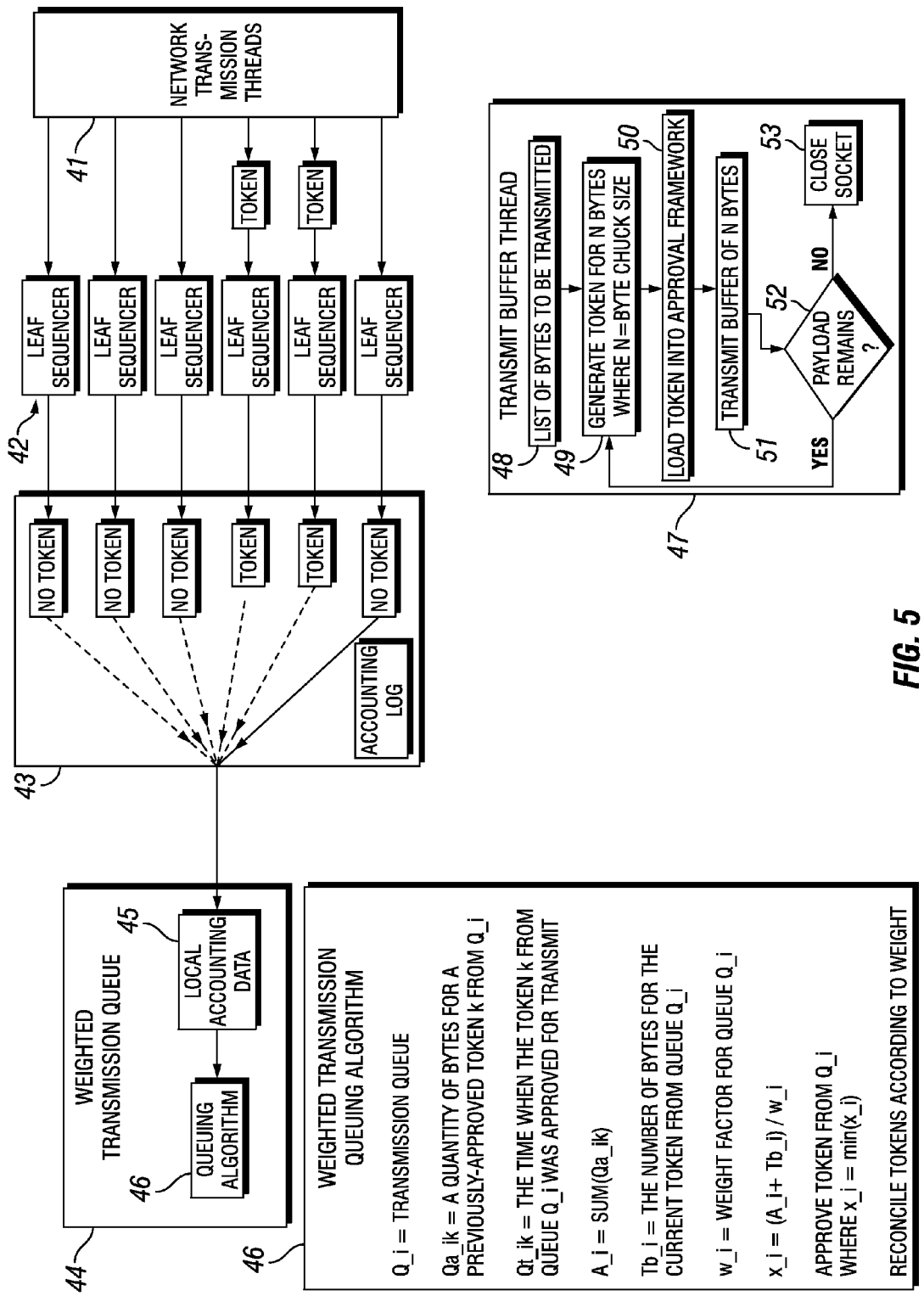
FIG. 5 shows an example of generic (plain) Weighted Fair Queuing (WFQ) for bandwidth management for non-ABR HTTP traffic flows.

FIG. 5 shows an example of generic (plain) WFQ for bandwidth management for non-ABR HTTP traffic flows. A plurality of Network Transmission Threads (NTTs) 41 associated with multiple client sessions, e.g., media streaming sessions involving one or more ABR clients, and optionally, one or more non-ABR clients, are illustratively provided, which may be stored in a suitable storage area or memory associated with the ABR QoE Management Unit 10. A plurality of leaf sequencers 42 are configured to receive transmission request tokens from one or more NTTs. In one embodiment, there may be exactly one leaf sequencer per "transmission class" of communication flows or sessions. For example, the transmission class for a leaf sequencer may be configured based on a client's IP address. That is, if one client is trying to download multiple segments, they must share the same leaf sequencer. A transmission class may also be configured based on a session ID of a communication session, flow or stream IDs, QoS level, Class of Service (CoS) level, group ID of devices, source/destination IP addresses, and the like. For example, one client may be assigned a different priority based on the type of video content. In that case, the transmission class may be identified by a session ID. In the case of data download, it could be a session ID associated with a download of data or a session ID for a particular gaming session, as an example. Accordingly, in some embodiments, leaf sequencers 42 may represent individual devices in a subscriber premises or a group of mobile devices being served by a base station for video delivery. In other embodiments, the leaf sequencers may represent on-demand video assets from various content sources, and the like.

A first stage component 43 facilitates the token selection process. In one example implementation, the queuing functionality is based on WFQ and may be configured to perform an approval process. A Weighted Transmission Queue 44 stores local accounting data 45 and applies a Weighted Transmission Queuing Algorithm 46 as shown in the box below.

An approval loop process 47 for a single thread indicates the iterative nature of the selection, arbitration, and transmission aspects of the ABR QoE Management Unit 10. The illustrative token approval loop may be iteratively executed for transmission of payload data from a plurality of NTTs corresponding to different client devices. At block 48, an NTT lists a number of bytes to be transmitted on the link. At block 49, a token is generated for a specified amount of payload data, e.g., N bytes, where N equals the byte chunk size. At block 50, the token for the thread is loaded into the hierarchical approval framework described above. At block 51, once the token is approved, the N bytes are transmitted on the link. At decision block 52, it is determined whether any payload remains to be transmitted. If not, the approval loop 47 proceeds to block 53 where the transmission socket is closed. On the other hand, if payload remains, process 47 loops back to block 49 where additional tokens may be generated for corresponding chunks of data. As noted previously, the foregoing approval loop process may take place for multiple transmit buffer threads, each submitting respective tokens to the approval framework as needed.

Plain WFQ traffic management is best for non-ABR traffic and provides for the bandwidth management of non-ABR streams. When using plain WFQ, ABR clients will often change bit rates as a result of other ABR clients sleeping due to a full buffer. When plain WFQ is used for ABR video delivery, a degraded QoE occurs.

Figure 6:
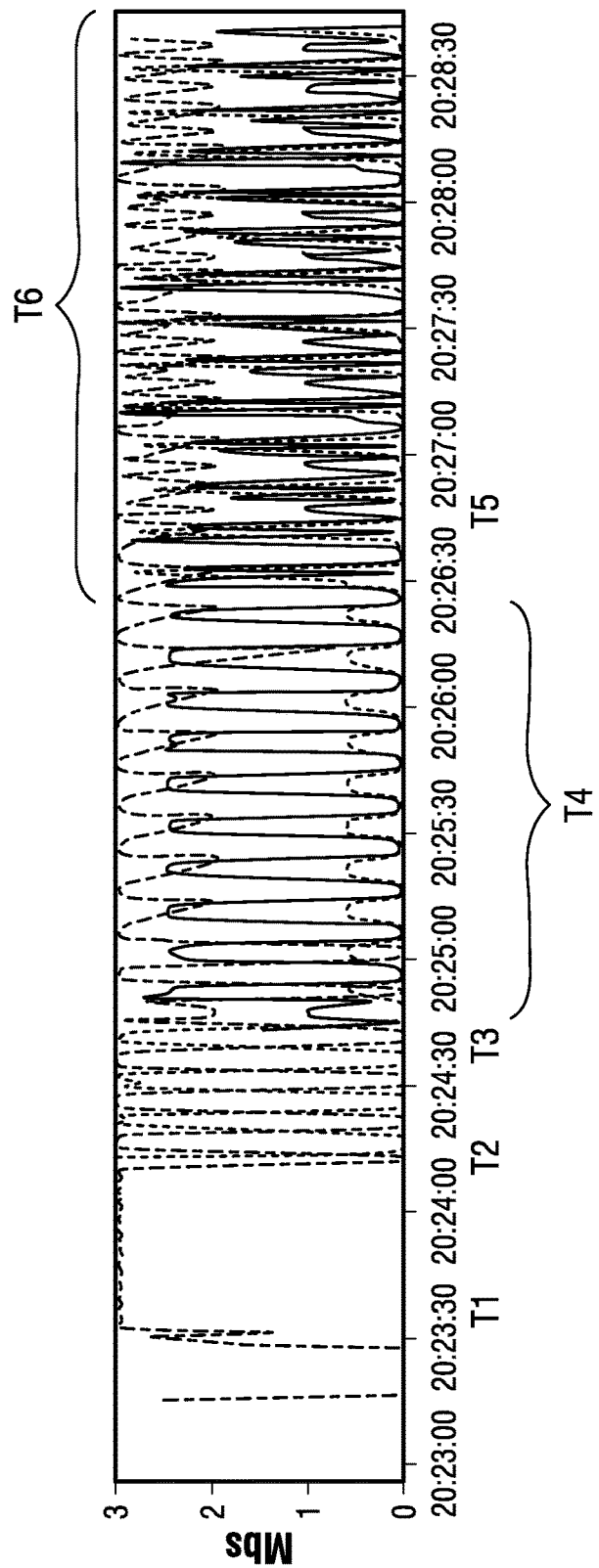
FIG. 6 is a network usage graph showing a generic (plain) WFQ algorithm and its impact on the ABR clients.

FIG. 6 is a network graph showing a generic WFQ algorithm and its impact on three ABR clients utilizing a 3 Mbs network pipe. A video manifest includes segments of 2 Mbs, 1.6 Mbs, 1.2 Mbs, 900 Kbs, 600 Kbs, and 300 Kbs. The three clients include Device-1 with a 3.0 weighting, Device-2 with a 1.5 weighting, and Device-3 with a 0.6 weighting. Generic WFQ caps the bandwidth, thus saturating the link. The problem occurs when lower weighted clients wake up from their duty cycle to pull a segment while the higher weighted clients are sleeping. This causes the lower weighted clients to periodically attempt to move up in their manifest profile and become aggressive only to get knocked down again in the future.

At time T1, the 3.0-weighted Device-1 begins playing video. Its allocated bandwidth is 3.0 Mbs and Device-1's buffer fill begins. At time T2, the 0.6-weighted Device-3 begins playing video. Allocated bandwidths are 2.5 Mbs for Device-1 and 0.4999 Mbs for Device-3. At time T3, during buffer fill, Device-3 fills the pipe while Device-1 is in its duty cycle (full buffer with 2 Mbs segments and maintaining buffer state. Device-3 pulls segments on buffer fill. Spikes in bandwidth usage should be noted. Device-1 does not saturate the pipe and WFQ is not activated while Device-1 is sleeping, thus allowing Device-3 to fully consume the pipe. Device-3 is playing an 800 Kbs profile.

During time segment T4, Device-2 joins. Allocated bandwidths are 1.68 Mbs for Device-1, 0.981 Mbs for Device-2, and 0.336 Mbs for Device-3. During Device-2's buffer fill, the pipe is always saturated by Device-2. Bandwidth allocations are correct for all three devices. At time T5, all three devices' buffers are full for correct bitrate segments based on WFQ calculations. All three devices begin their duty cycles.

During the duty cycles in time segment T6, all clients receive the full pipe at some point as a result of other clients sleeping. At times, the 0.6-weighted Device-3 gets the full pipe. At other times, the 1.5-weighted Device-2 or the 3.0-weighted Device-1 gets the full pipe. This, along with the aggressive nature of the clients results in the 0.6-weighted Device-3 moving up in bitrate, sometimes drastically, only to get knocked back down into its proper bandwidth class. This has adverse QoE effects on all ABR client sessions inside the network pipe.

Thus, with generic WFQ and ABR client duty cycle behavior, there could be times when a 1 Mbps client would get anywhere between 6 Mbps and 1 Mbps. One solution could be to hybridize WFQ and cap all of the http sessions to a fixed cap and never let those devices leave that cap. For example, assume there is a 6 Mbps pipe and three devices downloading data using the generic WFQ method. Device-1 is weighted at 3.0, Device-2 at 2.0, and Device-3 at 1.0. If all three devices are active on the link, Device-1 would get 3 Mbps, Device-2 would get 2 Mbps, and Device-3 would get 1 Mbps, regardless of the type of data they are downloading. If active ABR video sessions are always capped at their calculated bandwidth, it would smooth out the QoS for all sessions and create a consistent QoE for the end user. However, this causes a waste in other types of http/https traffic.

Figure 7A:
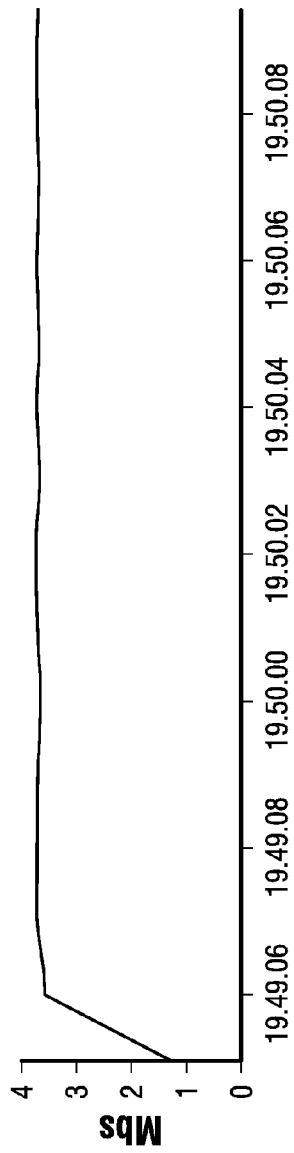
FIGS. 7A-7B are network usage graphs showing a generic WFQ algorithm and its impact on a non-ABR data download and an ABR video playout, respectively.
Figure 7B:
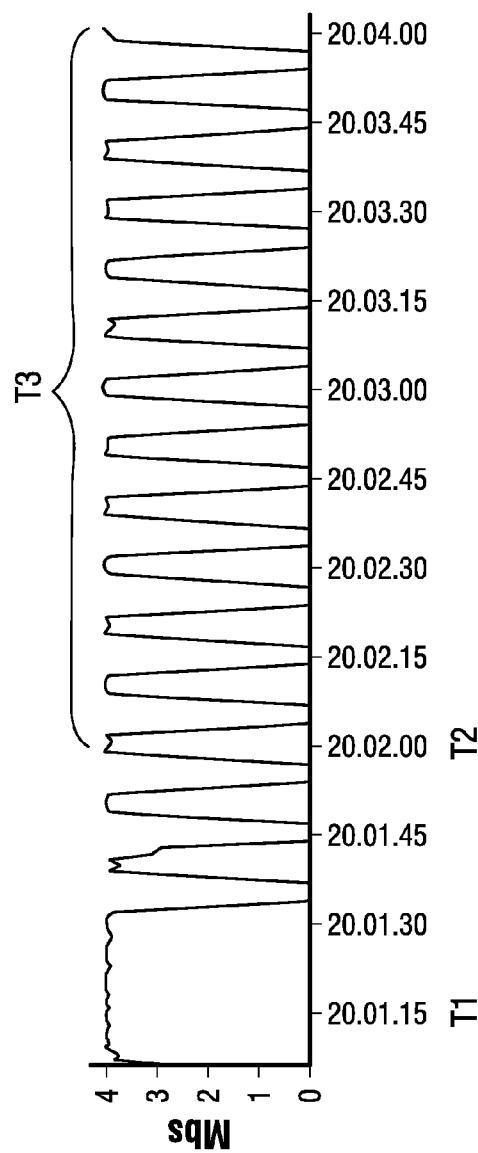

FIGS. 7A-7B are network graphs showing a generic WFQ algorithm and its impact on a non-ABR data download and an ABR video playout, respectively.

Referring to FIG. 7A, the network graph shows the bandwidth usage for a non-ABR data download such as downloading a large email attachment in a 4 Mbs pipe. The email download could take advantage of the free bandwidth when the ABR client is sleeping. Once the download starts, the pull of data is continuous until the download is completed. There is always link activity until the session ends or all data is downloaded.

Referring to FIG. 7B, the network graph shows the bandwidth usage for an ABR video playout in a 4 Mbs pipe. After the initial pull of ABR video data is started at T1 and the client's buffer is filled at T2, link activity goes up and down throughout the ABR active video session as shown in time interval T3. However, if all http sessions were capped based on the assumption that all http/https sessions were always active, then ABR video duty cycles would lead to bandwidth wastage in the network.

Figure 8:
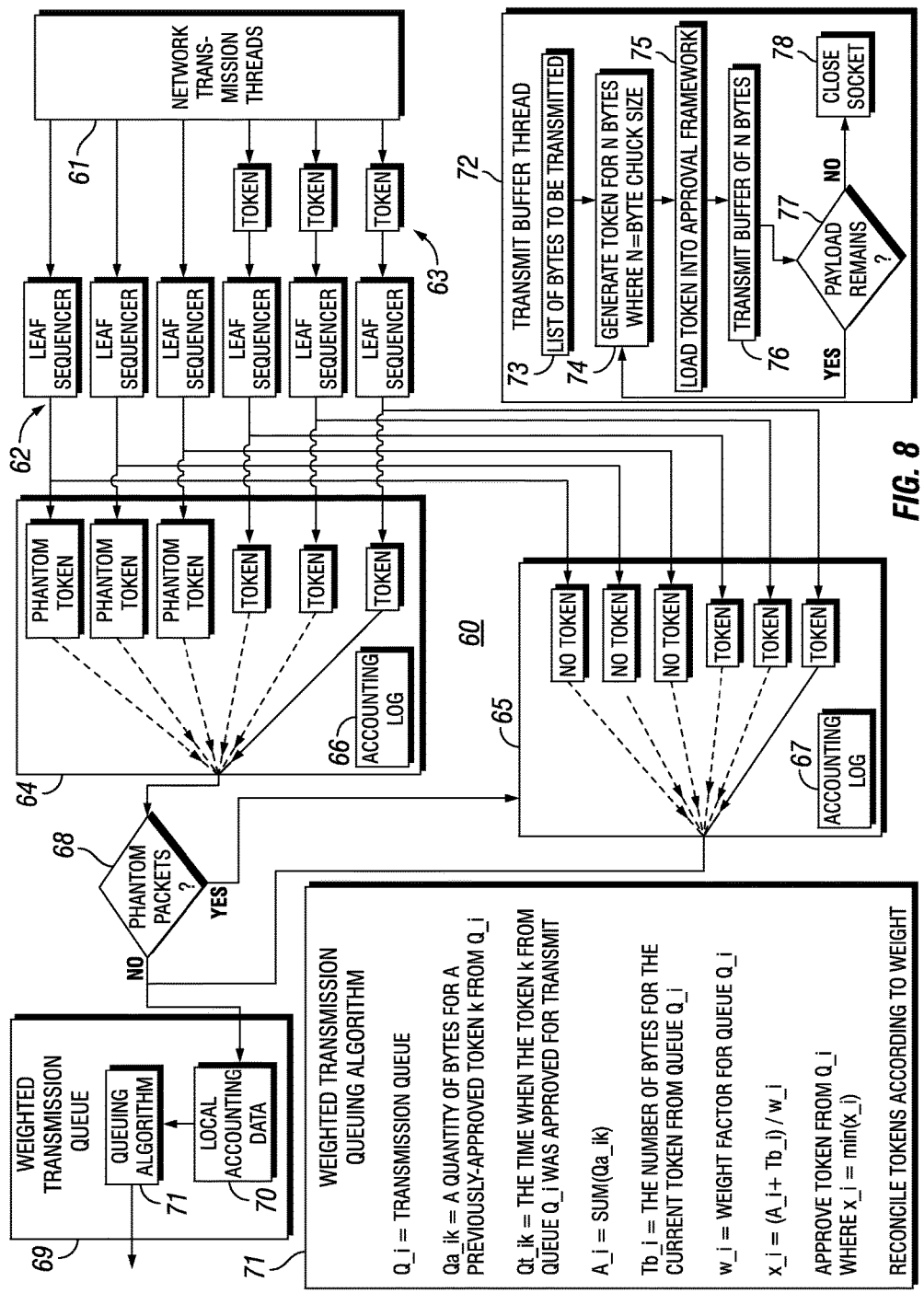
FIG. 8 shows an example of Phantom Packet Transmission (PPT) WFQ for bandwidth management for ABR HTTP traffic flows.

FIG. 8 shows an example system employing Phantom Packet ABR optimized WFQ for bandwidth management for ABR http traffic flows. To overcome the drawbacks of generic WFQ, a variant called Phantom Packet Transmission (PPT) provides the best of both worlds in which it is optimized for both http ABR and non-ABR delivery. This type of traffic management is best for ABR traffic and provides for the bandwidth management of ABR streams. When a client is in the idle phase of its duty cycle, Phantom Packets are generated to simulate a continuous network demand; however, Phantom Packets are not transmitted on the link. If the WFQ algorithm selects one of the Phantom Packets for transmission, the WFQ process does not transmit a packet to the ABR client. Instead, it selects a replacement real packet and transmits the replacement real packet to a non-ABR client. This allows for non ABR traffic to benefit from higher bandwidth when the ABR clients are in the idle phase of their duty cycles. This requires two layers of accounting (first layer for all the traffic classes, and a second layer for all the non-ABR traffic classes) to ensure bandwidth is divided fairly. In regular WFQ ABR, a client is tricked into thinking it has extra bandwidth just because it is pulling during the idle phase of competing clients' duty cycles. Phantom Packet Transmission WFQ prevents that by creating a phantom load during the idle phases. This results in a more stable ABR client behavior.

The example system incorporates hierarchical token approval logic based on suitable queuing for managing bandwidth allocation and QoS of video delivery in a number of scenarios. The system may be configured to be operative at a subscriber premises or in the network, depending on the application. A hierarchical token approval logic module (TALM) 60 creates phantom tokens so as to simulate the network contention that would exist if the ABR clients were to experience no peaks and valleys of a duty cycle. In other words, the sleep phases of an ABR client's duty cycle are "masked" such that the rest of the ABR clients are "tricked" into behaving as though there is no extra bandwidth made available. Once the phantom tokens/packets have been used for bandwidth calculation, they can be replaced with real network traffic, for example non-ABR traffic, in an optional replacement stage, if any bandwidth remains that would have otherwise been used by other opportunistic ABR clients to artificially inflate their video quality.

For purposes of the present disclosure, a phantom token is a token that is not associated with any actual payload traffic of an NTT corresponding to a client's communication session. In accordance with the teachings herein, phantom tokens may be issued by leaf sequencer nodes in a nested/hierarchical WFQ arrangement when a parent node queries or polls its child sequencer node and the child sequencer node has not loaded a normal or regular token from a client session's NTT. Normally, if an NTT loads a token into an associated leaf sequencer, it is a real token or request for permission to transmit a chunk of actual payload data. If the NTT has not loaded a token into its corresponding leaf sequencer, e.g., because the client is not currently downloading a segment (i.e., sleep phase or sleep mode), then when the parent node queries the leaf sequencer of the ABR session, it will provide a phantom token to generate the illusion that the client is downloading rather than "resting" in the sleep phase of its duty cycle.

A plurality of NTTs 61 associated with multiple client sessions, e.g., media streaming sessions involving one or more ABR clients, and optionally, one or more non-ABR clients, are illustratively provided, which may be stored in a suitable storage area or memory associated with the ABR QoE Management Unit 10. A plurality of leaf sequencers 62 are configured to receive transmission request tokens 63 from one or more NTTs. In one embodiment, there may be exactly one leaf sequencer per "transmission class" of communication flows or sessions. For example, the transmission class for a leaf sequencer may be configured based on a client's IP address. That is, if one client is trying to download multiple segments, they must share the same leaf sequencer. A transmission class may also be configured based on a session ID of a communication session, flow or stream IDs, QoS level, Class of Service (CoS) level, group ID of devices, source/destination IP addresses, and the like. For example, one client may be assigned a different priority based on the type of video content. In that case, the transmission class may be identified by a session ID. In the case of data download, it could be a session ID associated with a download of data or a session ID for a particular gaming session, as an example. Accordingly, in some embodiments, leaf sequencers 62 may represent individual devices in a subscriber premises or a group of mobile devices being served by a base station for video delivery. In other embodiments, the leaf sequencers may represent on-demand video assets from various content sources, and the like.

In one arrangement, hierarchical TALM 60 may be implemented as a nested two-stage approval framework or scheme with components that may be selectively activated. A first stage component 64 is configured to receive: (i) phantom tokens from leaf sequencers servicing NTTs that correspond to one or more ABR clients in inactive phases of their respective traffic download duty cycles, (ii) regular tokens from leaf sequencers servicing NTTs that correspond to one or more ABR clients in active phases of their respective traffic download duty cycles, and/or (iii) regular tokens from leaf sequencers servicing NTTs that correspond to one or more non-ABR clients continuously pulling data for respective communication sessions. A second stage component 65 operating selectively in conjunction with the first stage component 64 is provided for receiving only regular tokens. Such regular tokens are the same regular tokens provided to the first stage component, i.e., (i) tokens from leaf sequencers servicing NTTs that correspond to one or more ABR clients in active phases of their respective traffic download duty cycles, and/or (ii) tokens from leaf sequencers servicing NTTs that correspond to one or more non-ABR clients continuously pulling data for respective communication sessions. In one variation, the structure and functionality of the first stage component 64 may be selectively inactivated via suitable feature selection control signals, e.g., from a network operator, when the functionality of utilizing phantom tokens/packets in bandwidth estimations or computations is not needed in a network. That is, the first stage component may be bypassed when inactivated, in which case only the token approval logic of the second stage component is operative for servicing the tokens emanating from the NTTs 61. Likewise, the second stage component 65 may be selectively bypassed (e.g., where are there no non-ABR clients or where bandwidth allocation to a replacement client is desired), whereby only the first stage component 64 is operative (provided it has been selected) for providing bitrate locking with respect to the ABR clients.

Because the first stage component 64 is configured to receive phantom tokens, it may be referred to as a phantom-enabled token approval stage. Likewise, the second stage component 65 may be referred to as a normal token approval stage (when operating solely) and/or replacement token approval stage (when operating in conjunction with the phantom-enabled token approval first stage). To ensure fairness at both stages of the token approval framework, each stage may be provided with its own accounting log module for reconciling tokens being submitted for selection. Accordingly, a first accounting log module 66, which may be referred to as a phantom-enabled accounting log module, and a second accounting log module 67, which may be referred to as a replacement or normal accounting log module, are provided in association with the first and second stage components 64, 65, respectively.

Since phantom tokens are provided only to the first stage component 64, the corresponding slots in the second stage component 65 indicate "no token". Regular tokens are received by both stages and are indicated as "token".

At a decision block 68, the system determines whether there are any phantom packets. If not, regular packets go into a weighted transmission queue 69, which stores local accounting data 70 and applies a Weighted Transmission Queuing Algorithm 71 as shown in the box below.

If, however, it is determined at block 68 that there are phantom packets, the system may execute the Weighted Transmission Queuing Algorithm 71 by the first stage component 64 or the second stage component 65, or both, to facilitate the token selection process depending on selective activation of the components as described above.

Typically, the hierarchical token approval process and arbitration of selected tokens for transmission queuing may be performed in multiple iterations for each NTT as long as there is payload data to be transmitted. An approval loop process 72 for a single thread is shown to indicate the iterative nature of the selection, arbitration, and transmission aspects of the system. At block 73, an NTT lists a number of bytes to be transmitted on the link. At block 74, a token is generated for a specified amount of payload data, e.g., N bytes, where N equals the byte chunk size. At block 75, the token for the thread is loaded into the hierarchical approval framework described above. At block 76, once the token is approved, the N bytes are transmitted on the link. At decision block 77, it is determined whether any payload remains to be transmitted. If not, the approval loop 72 proceeds to block 78 where the transmission socket is closed. On the other hand, if payload remains, process 72 loops back to block 74 where additional tokens may be generated for corresponding chunks of data. As noted previously, the foregoing approval loop process may take place for multiple transmit buffer threads, each submitting respective tokens to the approval framework as needed.

Figure 9:
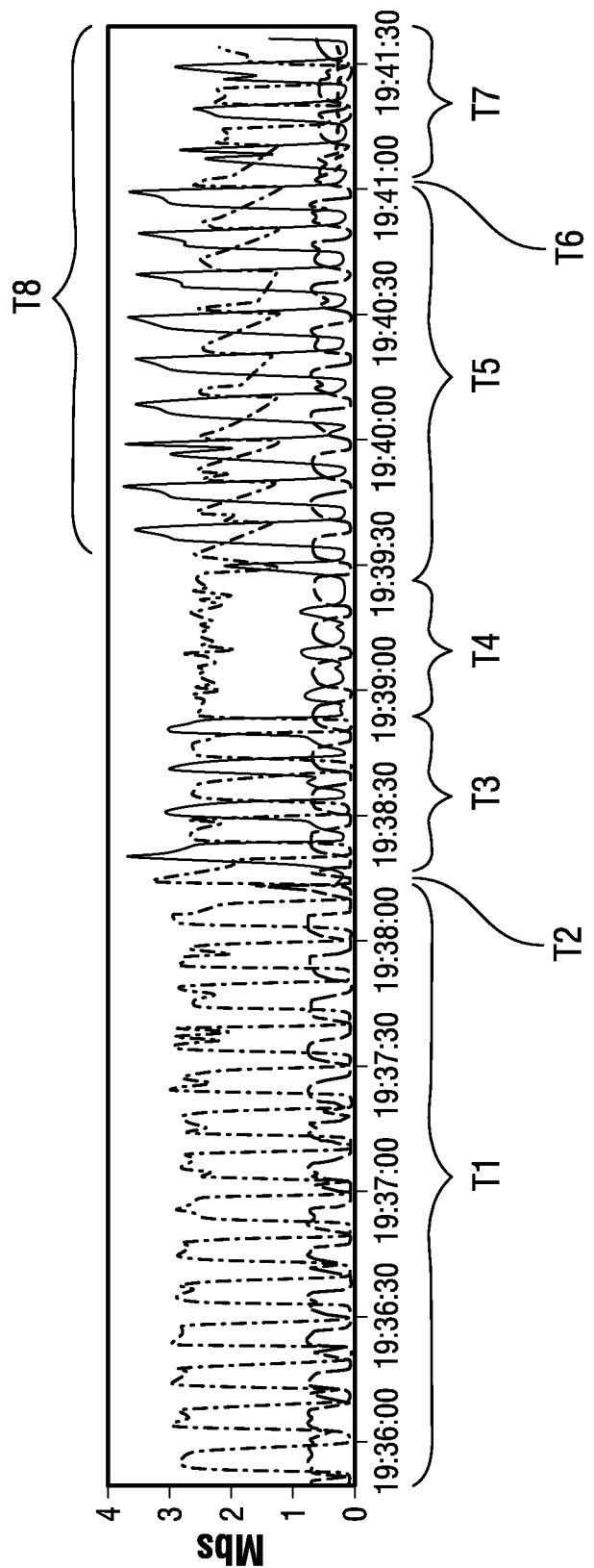
FIG. 9 is a network usage graph showing the effect of PPT WFQ on http/https data streams.

FIG. 9 is a network usage graph showing the effect of Phantom Packet Transmission (PPT) on http/https data streams in a 4 Mbs pipe. PPT overcomes the drawbacks of generic WFQ and provides superior performance. As described above, when a client is in the idle phase of its duty cycle, Phantom Packets are generated to simulate a continuous network demand. If the WFQ algorithm chooses one of the Phantom Packets for transmission, it is replaced by a packet from a non-ABR traffic class. This requires two layers of accounting—a first layer for all the traffic classes and a second layer for all the non-ABR traffic classes—to ensure bandwidth is divided fairly. In regular WFQ ABR, a client is tricked into thinking it has extra bandwidth just because it is pulling during the idle phase of its competing clients' duty cycles, but PPT prevents that by creating a phantom load during the idle phases. This results in a more stable ABR client behavior.

In the illustrated example, a video manifest includes segments of 2 Mbs, 1.6 Mbs, 1.2 Mbs, 900 Kbs, 600 Kbs, and 300 Kbs. There are three ABR clients: Device-1 with a 3.0 weighting, Device-2 with a 0.75 weighting, and Device-3 with a 0.4 weighting. There is also one non-ABR download client with a 0.175 weighting.

During time interval T1, the 3.0-weighted Device-1 and the 0.75-weighted Device-2 are playing ABR video. Device-1 is allocated 3.2 Mbs and Device-2 is allocated 0.8 Mbs. The devices never leave their allocated bitrates during their duty cycles. At time T2, the 0.175-weighted non-ABR download client joins. Bandwidth allocations are recalculated as 3.05 Mbs for Device-1, 0.764 Mbs for Device-2, and 0.178 Mbs for the non-ABR download client. Thereafter, during time interval T3, during ABR duty cycles, unused bandwidth is given to the non-ABR download client. Neither of the ABR clients is allowed bandwidth above their allocations.

During time interval T4, Device-1 forces a buffer fill as a result of jumping to another time in the video. This forces the non-ABR download client to remain in the bitrate calculation with the exception that Device-2 remains within its allocated bandwidth and continues playing the same QoS video. Device-2's unused duty cycle bandwidth is shared with the non-ABR download client.

During time interval T5, a constant QoS is maintained for all ABR video clients regardless of their duty cycles. Unused bandwidth as a result of the ABR clients' duty cycles is allocated to the non-ABR download client. Bandwidth allocations remain as 3.05 Mbs for Device-1, 0.764 Mbs for Device-2, and 0.178 Mbs for the non-ABR download client.

At time T6, ABR Device-3 joins. Bandwidth allocations are recalculated as 2.71 Mbs for Device-1, 2.75 Mbs for Device-2, 0.452 for Device-3, and 0.158 Mbs for the non-ABR download client. During time interval T7, Device-3 begins buffer fill. All ABR clients remain in their allocated bandwidths in and out of their duty cycles. The non-ABR download client receives unused bandwidth from Devices-1 and 2 that remain in their duty cycles.

During the duty cycles denoted as T8, only non-ABR clients receive the full pipe, optimizing the pipe for general data delivery as well as optimized bandwidth allocation and QoS for ABR clients.

PPT WFQ provides a number of advantages over generic WFQ, including consistency in video quality and delivery throughout the video session; well behaved ABR clients because their greedy behaviors are controlled; better utilization of network resources; improved sharing of network resources; higher bandwidth utilization; and optimization and control for non-ABR traffic flows.

Figure 10:
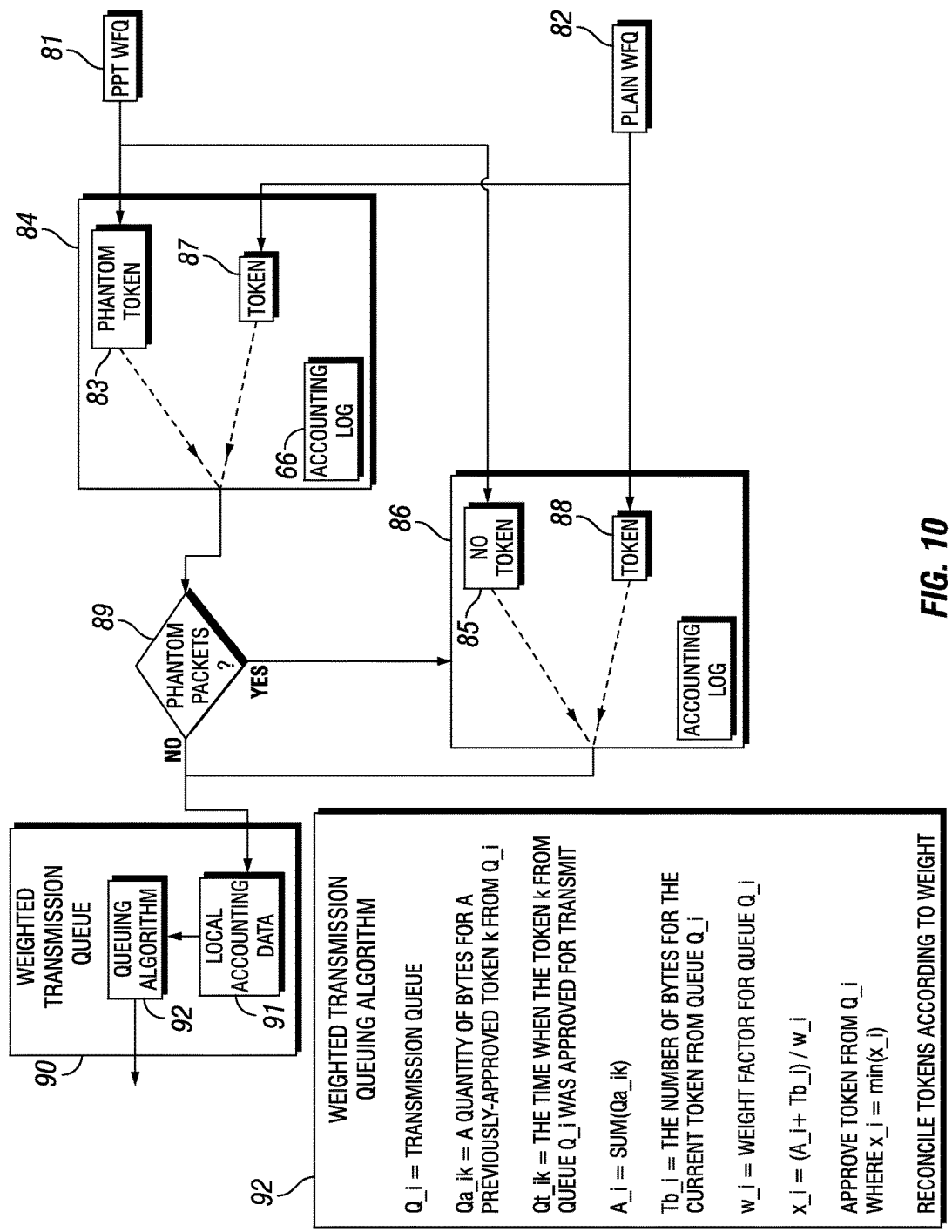
FIG. 10 shows an example of mixed PPT WFQ for bandwidth management combining ABR and non-ABR http traffic flows.

FIG. 10 shows an example of mixed Phantom WFQ for bandwidth management combining ABR and non-ABR http traffic flows. FIG. 9 is an example flow of filtering the ABR vs the non-ABR http traffic. This is an enhancement or extension of the generic/plain WFQ and PPT WFQ where ABR flows travel through the PPT WFQ flow 81 and the non-ABR flows travel through the plain WFQ flow 82. In this example, the PPT WFQ flow sends a phantom token 83 to a first stage component 84 and no token 85 to a second stage component 86. The plain WFQ flow sends a regular token 87 to the first stage component 84 and a regular token 88 to the second stage component 86. Because the first stage component 84 is configured to receive phantom tokens, it may be referred to as a phantom-enabled token approval stage. Likewise, the second stage component 86 may be referred to as a normal token approval stage.

At a decision block 89, the system determines whether there are any phantom packets. If not, regular packets go into a weighted transmission queue 90, which stores local accounting data 91 and applies a Weighted Transmission Queuing Algorithm 92 as shown in the box below.

If, however, it is determined at block 89 that there are phantom packets, the system may execute the Weighted Transmission Queuing Algorithm 92 by the first stage component 84 or the second stage component 86, or both, to facilitate the token selection process.

Figure 11:
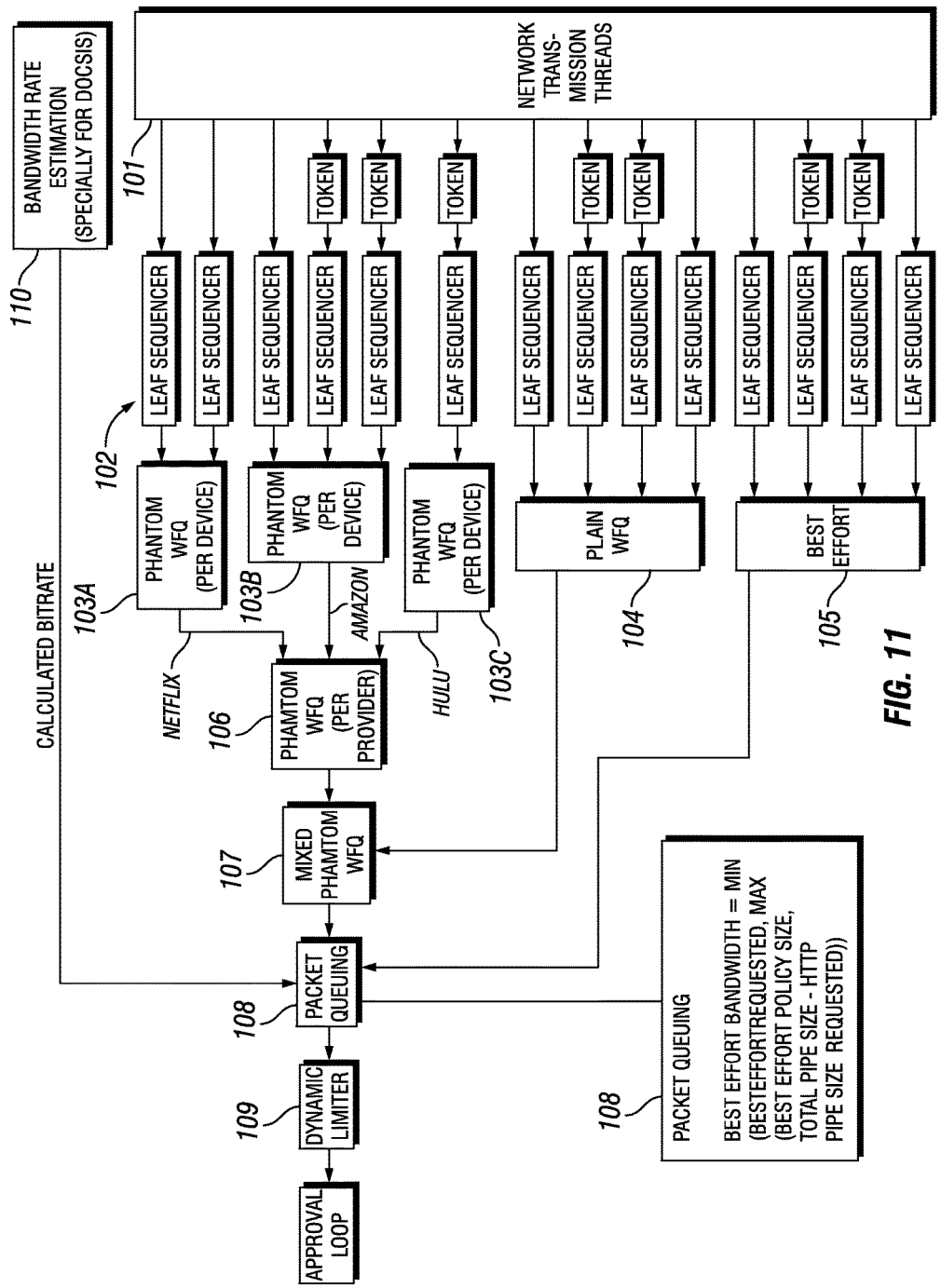
FIG. 11 shows an example of mixed HTTP ABR/non-ABR Managed and Non-HTTP Best Effort bandwidth management.

FIG. 11 shows an example of mixed http ABR/non-ABR Managed and Non-http Best Effort bandwidth management utilizing mixed nested virtual pipes. Looking from the right to the left, from NTTs 101, an ABR identified traffic flow travels through leaf sequencers 102 into a number of Phantom WFQ processing flows 103a-103c, one per OTT provider for each of the active ABR sessions. In addition, a non-ABR http traffic flow travels through leaf sequencers 102 into the plain WFQ processing flow 104. If the content is not http traffic, it travels through leaf sequencers 102 into the best effort processing flow 105.

The output for each of the Phantom ABR optimized WFQ process flows 103a-103c feeds into a Phantom WFQ per provider flow 106. This type of nesting enables the generation of a WFQ-controlled virtual pipe per provider where control of the bandwidth in each pipe is based on a defined pipe priority/weight. Moving to the left, both the output from the plain WFQ processing flow 104 and the phantom WFQ per provider flow 106 feeds into a mixed Phantom WFQ processing flow 107. The mixed phantom WFQ processing flow allows for the non-ABR traffic to use unused bandwidth from the ABR delivery virtual pipe as a result of the ABR clients sleep and wake duty cycles. This provides the optimal in http bandwidth management and ABR video QoE for both ABR and non-ABR http traffic.

The final stage in the processing in the nested pipes is to manage the bandwidth limits and sharing for the non-http traffic. This may be done by a simple means referred to in this disclosure as "Chris's packet queuing" (CPQ). The http traffic from the mixed phantom WFQ processing flow 107 and the non-http traffic from the best effort processing flow 105 is fed into a CPQ algorithm 108, which confines all of the traffic to fit in the outermost pipe. The CPQ algorithm may take the form:

Best Effort Bandwidth=min(BestEffortRequested,
 max(BestEffortPolicySize, total pipe size−http
 pipe size requested))

This provides for bandwidth usage across the two outermost inner pipes. It allows these two pipes to share bandwidth that is not being used. If there is no non-http traffic, the http traffic pipe can use the entire amount of bandwidth in the Internet (outermost) virtual pipe. Also, if there is no http traffic, the non-http pipe can use all of the bandwidth in the Internet (outermost) virtual pipe. Following the CPQ algorithm 108, packets go through a dynamic rate limiter 109 enroute to the approval loop.

The CPQ algorithm 108 also receives a calculated bitrate from a bandwidth rate estimation module 110 (specifically for DOCSIS). The one embodiment for DOCSIS in this disclosure is s bandwidth must be calculated throughout time. DOCSIS allows for up to a set maximum data rate, but that is not guaranteed. In some DOCSIS systems, the maximum data rate may be 50 Mb/s while in others it may be 9 Mb/s. It can be changing regularly based on neighboring usage. This invention must dynamically change the size of the outermost virtual pipe in order to achieve proper bandwidth management in the non-stable connect speed of a DOCSIS network. For DSL networks, based on their differences in architecture, bandwidth is always guaranteed.

Figure 12:
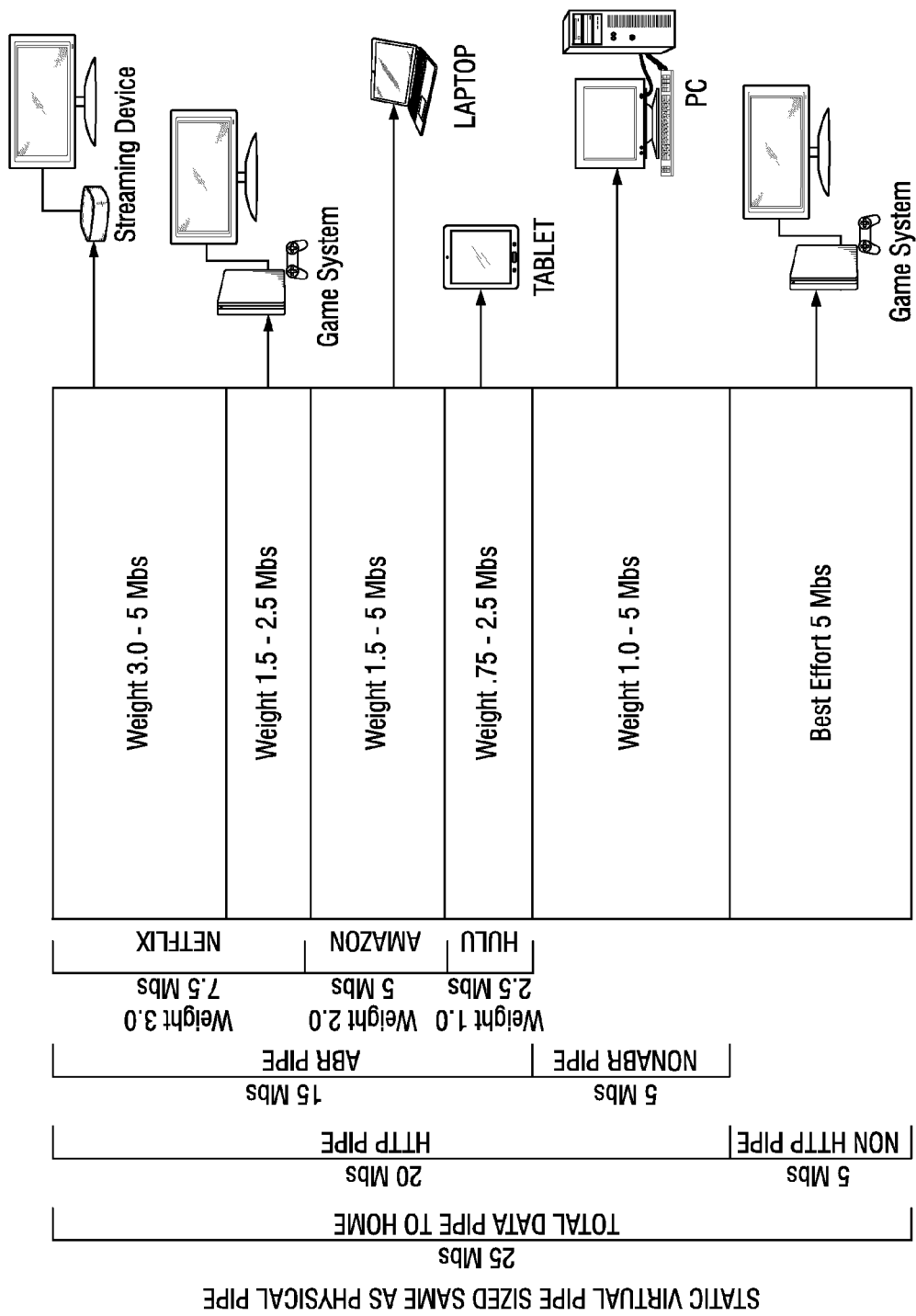
FIG. 12 shows an exemplary allocation of bandwidth across all pipes in a first use-case scenario.

FIG. 12 shows an exemplary allocation of bandwidth across all pipes in a first use-case scenario. In this scenario, there are three OTT providers, two devices watching Netflix®, one device watching Amazon Prime®, one device watching Hulu®, one device using http non-ABR, and one device gaming.

Figure 13:
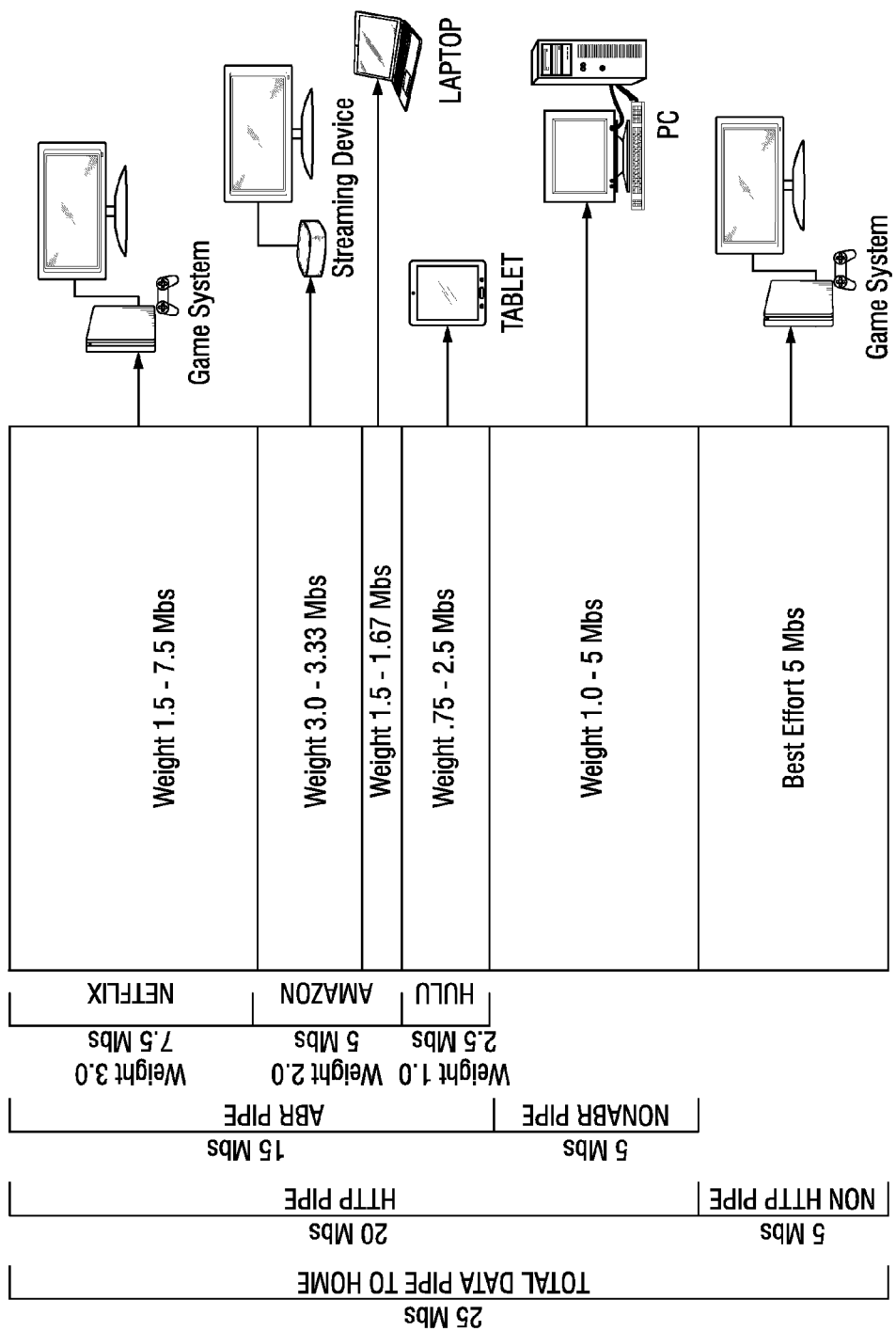
FIG. 13 shows an exemplary allocation of bandwidth across all pipes in a second use-case scenario.

FIG. 13 shows an exemplary allocation of bandwidth across all pipes in a second use-case scenario. In this scenario, there are three OTT providers, one device watching Netflix®, two devices watching Amazon Prime®, one device watching Hulu®, one device using http non-ABR, and one device gaming.

Figure 14:
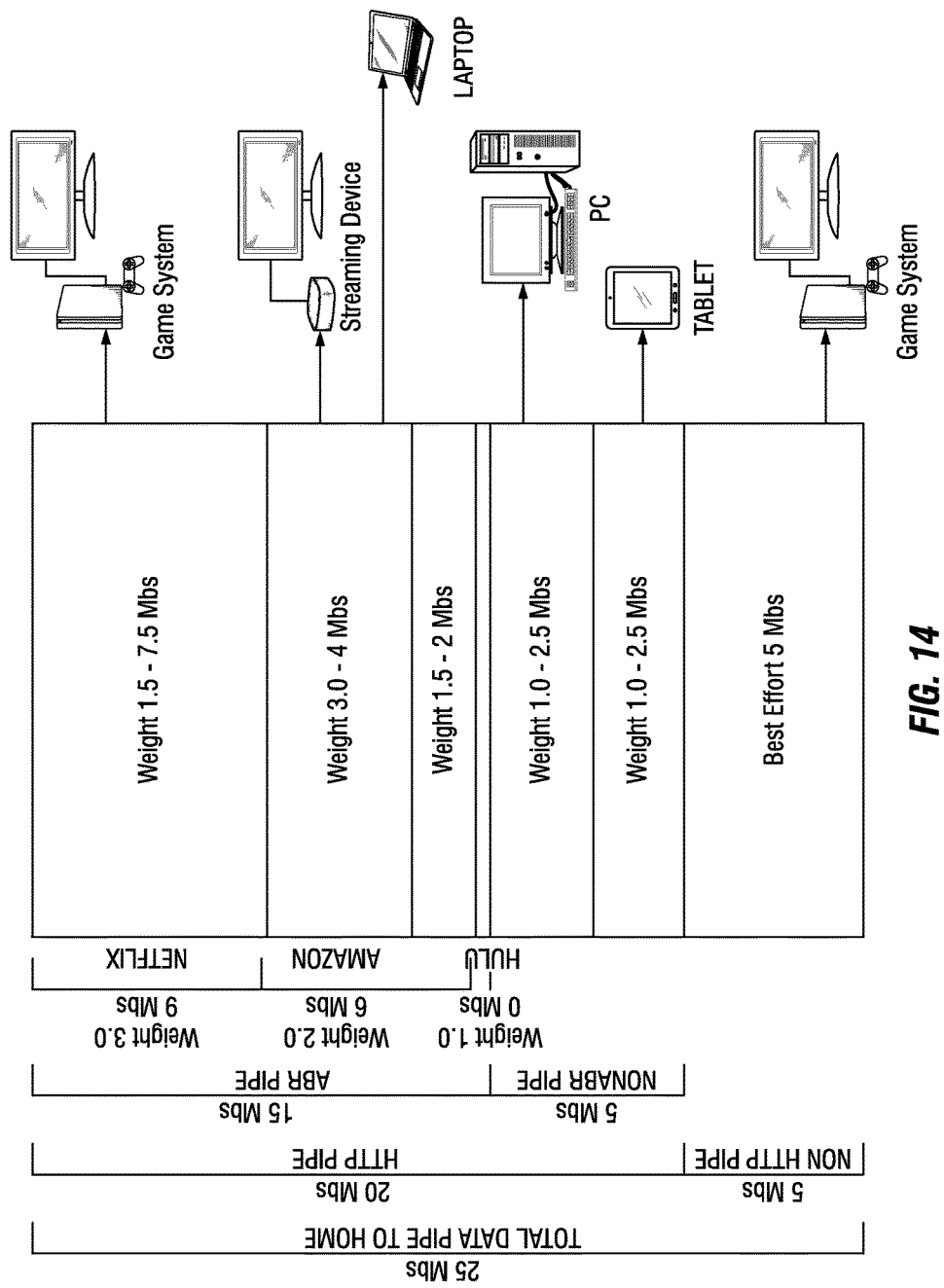
FIG. 14 shows an exemplary allocation of bandwidth across all pipes in a third use-case scenario.

FIG. 14 shows an exemplary allocation of bandwidth across all pipes in a third use-case scenario. In this scenario, there are three OTT providers, one device watching Netflix®, two devices watching Amazon Prime®, no devices watching Hulu®, one device using http non-ABR, and one device gaming.

Figure 15:
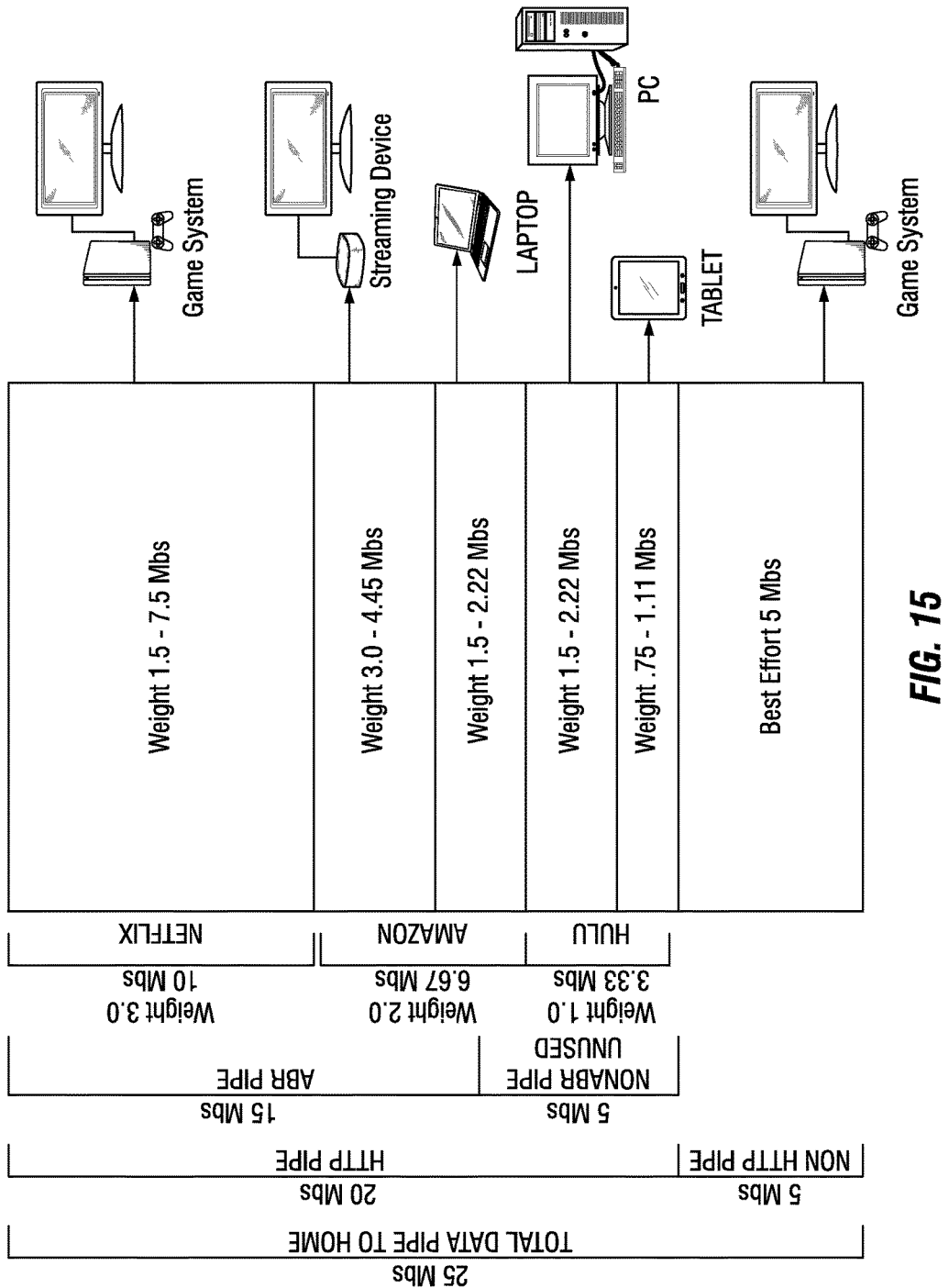
FIG. 15 shows an exemplary allocation of bandwidth across all pipes in a fourth use-case scenario.

FIG. 15 shows an exemplary allocation of bandwidth across all pipes in a fourth use-case scenario. In this scenario, there are three OTT providers, one device watching Netflix®, two devices watching Amazon Prime®, two devices watching Hulu®, no devices using http non-ABR, and one device gaming.

Figure 16:
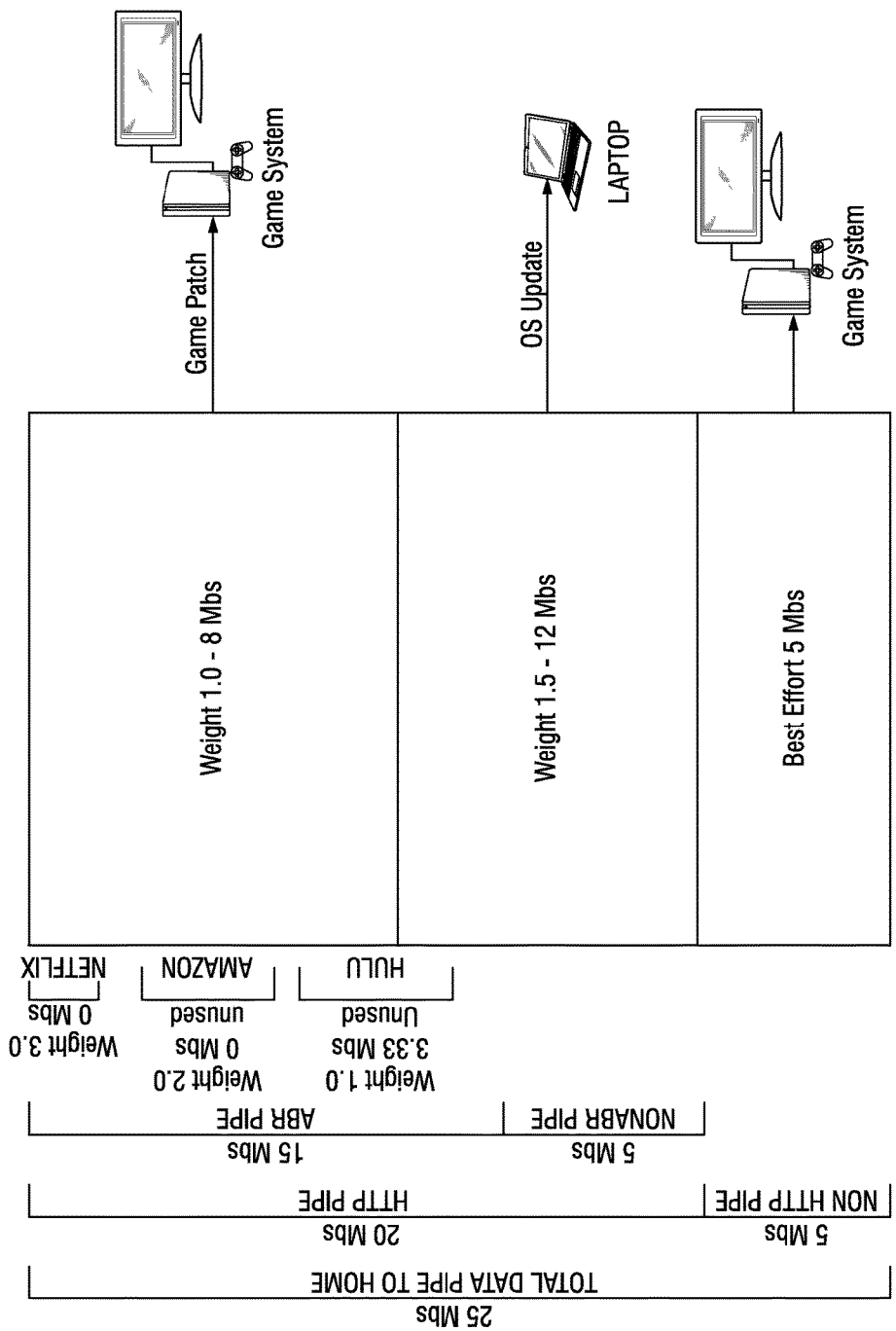
FIG. 16 shows an exemplary allocation of bandwidth across all pipes in a fifth use-case scenario.

FIG. 16 shows an exemplary allocation of bandwidth across all pipes in a fifth use-case scenario. In this scenario, there are no devices watching ABR content, two devices using http non-ABR, and one device gaming.

In the above manner, the disclosed system provides for a greatly improved ability to manage bandwidth used in a fixed network pipe to a home with a focus on the ability to manage QoE across OTT providers as well as multiple devices watching content.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A computer-controlled method in an Adaptive Bitrate (ABR) Quality of Experience (QoE) Management Unit at a customer premises for managing bandwidth usage and QoE at the customer premises where multiple client devices independently download content from multiple providers, the method comprising:
 assigning a priority level to each provider and to each client device;
 translating the assigned priority levels into weights; and
 utilizing the weights in a Weighted Fair Queuing (WFQ) algorithm to control, at any given time, an amount of bandwidth each client device is allowed to utilize to download content from any given provider, thereby maintaining a desired QoE for each client device/provider combination.

2. The method according to claim 1, wherein utilizing the WFQ algorithm includes utilizing Phantom Packet Transmission (PPT) WFQ to prevent a first client device from increasing its bit rate when a second client device is in an idle phase of its duty cycle due to a full buffer.

3. The method according to claim 2, wherein utilizing PPT WFQ includes:
 detecting that the second client device has entered the idle phase of its duty cycle; and
 generating phantom packets that are not associated with any actual payload traffic, wherein the phantom packets simulate a continuous network demand by the second client device while the second client device is in the idle phase of its duty cycle, thereby preventing the first client device from increasing its bit rate.

4. The method according to claim 3, wherein utilizing PPT WFQ also includes:
 selecting packets for transmission to the client devices;
 when a real packet containing actual payload traffic for an associated client device is selected for transmission, transmitting the selected real packet to the associated client device; and
 when a phantom packet is selected for transmission, transmitting a replacement real packet to a non-ABR client device that is utilizing a data stream that does not exhibit a duty cycle.

5. The method according to claim 1, wherein the ABR QoE Management Unit includes nested virtual pipes for provisioning bandwidth to different traffic classes, wherein an outer virtual pipe is sized the same as a physical Internet pipe and includes inner virtual pipes for http ABR traffic, http non-ABR traffic, and non-http traffic;
 wherein the method further comprises maintaining two layers of accounting, a first layer for all traffic classes, and a second layer for all non-ABR traffic classes, to ensure bandwidth is divided fairly.

6. The method according to claim 5, further comprising:
 dividing the inner virtual pipe for http ABR traffic into multiple dynamically throttled inner virtual pipes;
 assigning different providers to different dynamically throttled inner virtual pipes; and
 applying Phantom Packet Transmission (PPT) WFQ to traffic flows in each dynamically throttled inner virtual pipe to allow weighting at the pipe level based on a corresponding client device and provider.

7. An Adaptive Bitrate (ABR) Quality of Experience (QoE) Management Unit at a customer premises for managing bandwidth usage and QoE at the customer premises where multiple client devices independently download content from multiple providers, the ABR QoE Management Unit comprising:
 an interface configured to receive all data entering the premises and to monitor all data usage by the premises; and
 a processing circuit configured to:
  assign a priority level to each provider and to each client device;
  translate the assigned priority levels into weights; and
  utilize the weights in a Weighted Fair Queuing (WFQ) algorithm to control, at any given time, an amount of bandwidth each client device is allowed to utilize to download content from any given provider, thereby maintaining a desired QoE for each client device/provider combination.

8. The ABR QoE Management Unit according to claim 7, wherein the processing circuit is configured to utilize Phantom Packet Transmission (PPT) WFQ to prevent a first client device from increasing its bit rate when a second client device is in an idle phase of its duty cycle due to a full buffer.

9. The ABR QoE Management Unit according to claim 8, wherein the processing circuit is configured to utilize PPT WFQ by:
 detecting that the second client device has entered the idle phase of its duty cycle; and
 generating phantom packets that are not associated with any actual payload traffic, wherein the phantom packets simulate a continuous network demand by the second client device while the second client device is in the idle phase of its duty cycle, thereby preventing the first client device from increasing its bit rate.

10. The ABR QoE Management Unit according to claim 9, wherein the processing circuit is further configured to utilize PPT WFQ by:
 selecting packets for transmission to the client devices;
 when a real packet containing actual payload traffic for an associated client device is selected for transmission, transmitting the selected real packet to the associated client device; and
 when a phantom packet is selected for transmission, transmitting a replacement real packet to a non-ABR client device.

11. The ABR QoE Management Unit according to claim 7, wherein the ABR QoE Management Unit includes nested virtual pipes for provisioning bandwidth to different traffic classes, wherein an outer virtual pipe is sized the same as a physical Internet pipe and includes inner virtual pipes for http ABR traffic, http non-ABR traffic, and non-http traffic;
 wherein the processing circuit is configured to maintain two layers of accounting, a first layer for all traffic classes, and a second layer for all non-ABR traffic classes, to ensure bandwidth is divided fairly.

12. The ABR QoE Management Unit according to claim 11, wherein the processing circuit is further configured to:
 divide the inner virtual pipe for http ABR traffic into multiple dynamically throttled inner virtual pipes;
 assign different providers to different dynamically throttled inner virtual pipes; and
 apply Phantom Packet Transmission (PPT) WFQ to traffic flows in each dynamically throttled inner virtual pipe to allow weighting at the pipe level based on a corresponding client device and provider.

13. A system for managing bandwidth usage and Quality of Experience (QoE) at a customer premises where multiple client devices independently download content from multiple providers, the system comprising:
 a gateway providing a single point of entry for data entering the premises; and
 an Adaptive Bitrate (ABR) QoE Management Unit at the customer premises in communication with the gateway, comprising:
  a processing circuit configured to:
   assign a priority level to each provider and to each client device;
   translate the assigned priority levels into weights; and
   utilize the weights in a Weighted Fair Queuing (WFQ) algorithm to control, at any given time, an amount of bandwidth each client device is allowed to utilize to download content from any given provider, thereby maintaining a desired QoE for each client device/provider combination.

14. The system according to claim 13, wherein the processing circuit of the ABR QoE Management Unit is configured to utilize Phantom Packet Transmission (PPT) WFQ to prevent a first client device from increasing its bit rate when a second client device is in an idle phase of its duty cycle due to a full buffer.

15. The system according to claim 14, wherein the processing circuit of the ABR QoE Management Unit is configured to utilize PPT WFQ by:
    detecting that the second client device has entered the idle phase of its duty cycle; and
    generating phantom packets that are not associated with any actual payload traffic, wherein the phantom packets simulate a continuous network demand by the second client device while the second client device is in the idle phase of its duty cycle, thereby preventing the first client device from increasing its bit rate.

16. The system according to claim 15, wherein the processing circuit of the ABR QoE Management Unit is further configured to utilize PPT WFQ by:
    selecting packets for transmission to the client devices;
    when a real packet containing actual payload traffic for an associated client device is selected for transmission, transmitting the selected real packet to the associated client device; and
    when a phantom packet is selected for transmission, transmitting a replacement real packet to a non-ABR client device.

17. The system according to claim 13, wherein the ABR QoE Management Unit includes nested virtual pipes for provisioning bandwidth to different traffic classes, wherein an outer virtual pipe is sized the same as a physical Internet pipe and includes inner virtual pipes for http ABR traffic, http non-ABR traffic, and non-http traffic;
    wherein the processing circuit of the ABR QoE Management Unit is configured to maintain two layers of accounting, a first layer for all traffic classes, and a second layer for all non-ABR traffic classes, to ensure bandwidth is divided fairly.

18. The system according to claim 17, wherein the processing circuit of the ABR QoE Management Unit is further configured to:
    divide the inner virtual pipe for http ABR traffic into multiple dynamically throttled inner virtual pipes;
    assign different providers to different dynamically throttled inner virtual pipes; and
    apply Phantom Packet Transmission (PPT) WFQ to traffic flows in each dynamically throttled inner virtual pipe to allow weighting at the pipe level based on a corresponding client device and provider.

* * * * *